US009179141B2

(12) United States Patent
Sakamoto

(10) Patent No.: US 9,179,141 B2
(45) Date of Patent: Nov. 3, 2015

(54) THREE-DIMENSIONAL IMAGE DISPLAY APPARATUS AND VIEWING POSITION CHECK METHOD

(75) Inventor: Tsutomu Sakamoto, Fukaya (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 454 days.

(21) Appl. No.: 13/410,004

(22) Filed: Mar. 1, 2012

(65) Prior Publication Data
US 2013/0057659 A1 Mar. 7, 2013

(30) Foreign Application Priority Data
May 30, 2011 (JP) ................................ 2011-120935

(51) Int. Cl.
*H04N 13/04* (2006.01)
*H04N 17/04* (2006.01)
*G02B 27/26* (2006.01)
*H04N 13/02* (2006.01)

(52) U.S. Cl.
CPC ................ *H04N 17/04* (2013.01); *G02B 27/26* (2013.01); *H04N 13/0425* (2013.01); *H04N 13/0434* (2013.01)

(58) Field of Classification Search
CPC .. A61B 1/041; A61B 1/00036; A61B 1/0005; A61B 19/52; H04N 7/18; H04N 13/0497; H04N 13/0404; H04N 13/0409; H04N 13/0422; G02B 27/2214
See application file for complete search history.

(56) References Cited

U.S. PATENT DOCUMENTS

| 5,912,671 | A | * | 6/1999 | Oka ............................... 345/427 |
| 6,811,489 | B1 | * | 11/2004 | Shimizu et al. ................. 463/43 |
| 2008/0024727 | A1 | * | 1/2008 | Provitola ........................ 353/10 |
| 2008/0252718 | A1 | * | 10/2008 | Provitola ........................ 348/42 |
| 2009/0102915 | A1 | * | 4/2009 | Arsenich ........................ 348/53 |
| 2010/0177172 | A1 | * | 7/2010 | Ko et al. ......................... 348/53 |
| 2010/0208044 | A1 | * | 8/2010 | Robinson et al. ............... 348/53 |
| 2010/0245369 | A1 | | 9/2010 | Yoshino |

(Continued)

FOREIGN PATENT DOCUMENTS

| CN | 1696978 | 11/2005 |
| CN | 101000430 | 7/2007 |

(Continued)

OTHER PUBLICATIONS

Japanese Patent Application No. 2011-120935, Final Office Action, mailed Sep. 11, 2012, (with English Translation).

(Continued)

*Primary Examiner* — Sath V Perungavoor
*Assistant Examiner* — Howard D Brown, Jr.
(74) *Attorney, Agent, or Firm* — Rutan & Tucker LLP; William W. Schaal

(57) ABSTRACT

According to one embodiment, a three-dimensional image display apparatus displays, when an event of requesting a check of a viewing position occurs, a three-dimensional image for testing, by displaying on the display a three-dimensional display image which is obtained by using a left-eye image and a right-eye image included in the three-dimensional still image data for testing in a storage device. The three-dimensional image for testing includes such a first image that when the three-dimensional image for testing is viewed from a predetermined viewing area, stereoscopic images of a plurality of vertical rods disposed at different depth positions are perceived.

17 Claims, 10 Drawing Sheets

(56) References Cited

U.S. PATENT DOCUMENTS

| | | | |
|---|---|---|---|
| 2011/0007136 A1* | 1/2011 | Miura et al. | 348/46 |
| 2011/0051239 A1* | 3/2011 | Daiku | 359/464 |
| 2011/0109728 A1* | 5/2011 | Yoo et al. | 348/51 |
| 2011/0126159 A1* | 5/2011 | Ko et al. | 715/848 |
| 2012/0086777 A1* | 4/2012 | Chen et al. | 348/46 |
| 2013/0003177 A1* | 1/2013 | Ko | 359/464 |
| 2014/0139647 A1* | 5/2014 | Nagatani | 348/51 |

FOREIGN PATENT DOCUMENTS

| | | |
|---|---|---|
| CN | 102006491 | 4/2011 |
| JP | 63-316037 | 12/1988 |
| JP | 5-161166 | 6/1993 |
| JP | 10-322724 | 12/1998 |
| JP | 2001-056212 | 2/2001 |
| JP | 2002-095014 | 3/2002 |
| JP | 2003-199126 | 7/2003 |
| JP | 2005-223495 | 8/2005 |
| JP | 2005223495 | 8/2005 |
| JP | 2010-237619 | 10/2010 |
| JP | 2011-049630 | 3/2011 |
| JP | 2011-242533 | 12/2011 |

OTHER PUBLICATIONS

Japanese Patent Application No. 2011-120935, First Office Action, mailed Jul. 10, 2012, (with English Translation).

Chinese Patent Application No. 201210040048.6, Notification of the First Office Action, mailed Mar. 28, 2014, (with English Translation).

* cited by examiner

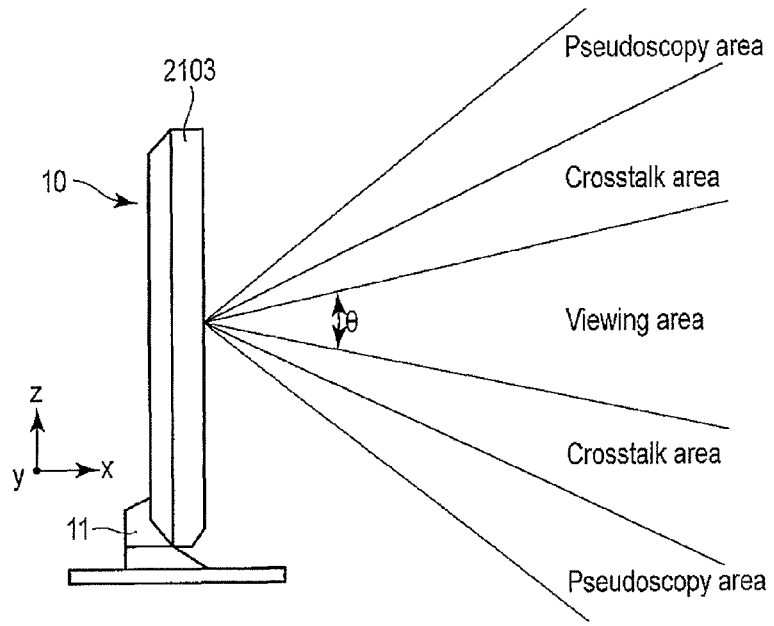
F I G. 2
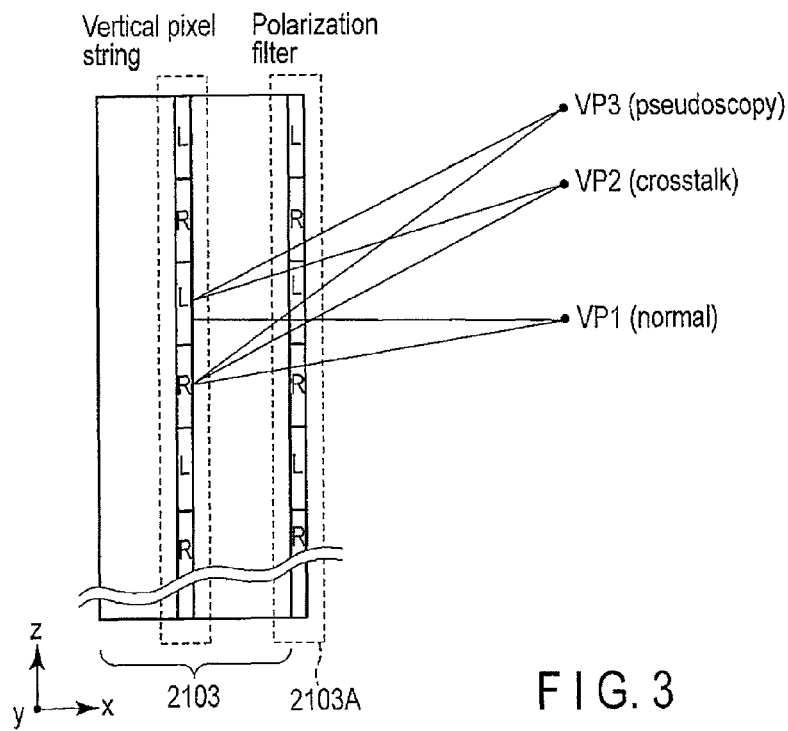
F I G. 3

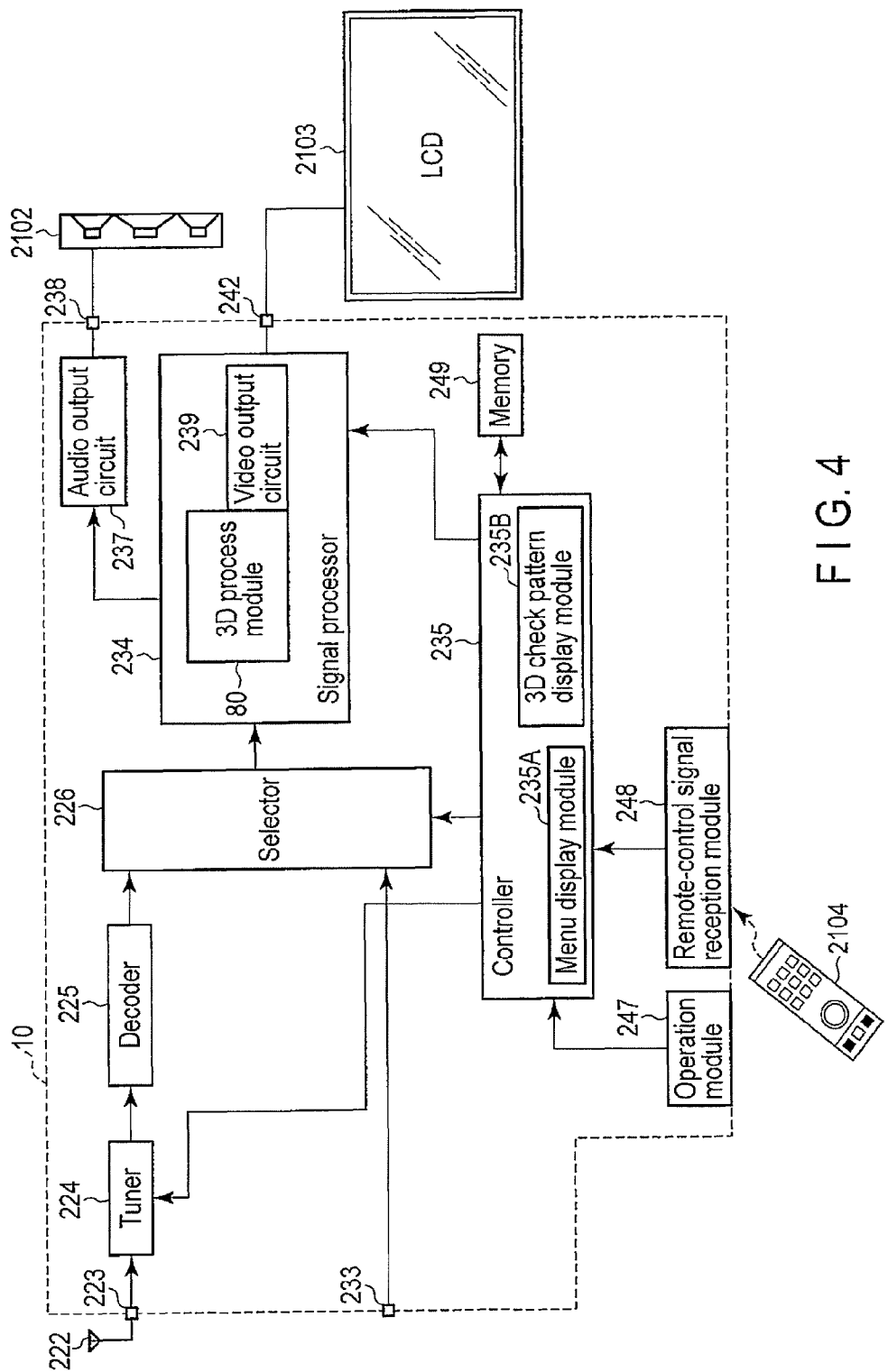
F I G. 4

THREE-DIMENSIONAL IMAGE DISPLAY APPARATUS AND VIEWING POSITION CHECK METHOD

CROSS-REFERENCE TO RELATED APPLICATIONS

This application is based upon and claims the benefit of priority from prior Japanese Patent Application No. 2011-120935, filed May 30, 2011, the entire contents of which are incorporated herein by reference.

FIELD

Embodiments described herein relate generally to a three-dimensional image display apparatus which displays three-dimensional images, and a viewing position check method which is applied to the apparatus.

BACKGROUND

In recent years, various types of three-dimensional (3D) image display apparatuses for viewing three-dimensional (3D) images, for instance, a three-dimensional (3D) TV, have been provided. In such 3D image display apparatuses, for example, a user is enabled to perceive 3D images (stereoscopic images) by using left-eye images and right-eye images based on binocular disparity.

Methods of displaying 3D images are classified into a glasses method using 3D glasses and a naked-eye stereopsis method (glasses-less 3D method). The methods of using 3D glasses include a shutter method (active method) and a polarization method (passive method). As the naked-eye stereopsis method (glasses-less 3D method), there are known, for instance, a lenticular method, a barrier method and an integral imaging method.

In these 3D image display apparatuses, an observer (user) can perceive normal stereoscopic images, that is, real stereoscopic images ("3D viewing") when viewing the display screen from a correct position. However, if the viewing position deviates from the correct position, stereopsis is no longer effected, and a phenomenon, such as crosstalk (3D crosstalk) or pseudoscopy, will occur. If 3D crosstalk occurs, a decrease in stereoscopic effect of the images, a decrease in depth effect of the images or appearance of double images (ghost images) will occur. Pseudoscopy is a phenomenon in which a left-eye image is incident on the right eye and a right-eye image is incident on the left eye. The crosstalk and pseudoscopy may possibly become factors which cause eyestrain of the user.

However, even when the user views an ordinary 3D moving picture such as a 3D movie or 3D TV broadcast program, the user cannot always confirm whether the user is actually enjoying 3D viewing. The reason for this is that picture patterns vary one after another in an ordinary 3D moving picture, and the picture patterns are complex. Thus, the user is unable to discriminate whether stereoscopic images, which the user currently perceives, are real stereoscopic images, and it is difficult for the user to confirm whether the present viewing position is within a correct viewing area (3D viewing area).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary view for describing the range of a viewing position of the 3D image display apparatus of the embodiment.

FIG. 3 is an exemplary view for explaining crosstalk and pseudoscopy in the 3D image display apparatus of the embodiment.

FIG. 4 is an exemplary block diagram illustrating the system configuration of the 3D image display apparatus of the embodiment.

DETAILED DESCRIPTION

Various embodiments will be described hereinafter with reference to the accompanying drawings.

In general, according to one embodiment, a three-dimensional image display apparatus comprises a reception module, a first display control module, a storage device and a second display control module. The reception module is configured to receive video content data. The first display control module is configured to display a three-dimensional image corresponding to each of frames of the received video content data, by displaying on a display a three-dimensional display image which is obtained by using a left-eye image and a right-eye image included in each of the frames of the received video content data. The storage device is configured to store three-dimensional still image data for testing. The second display control module is configured to display, when an event of requesting a check of a viewing position occurs, a three-dimensional image for testing, by displaying on the display a three-dimensional display image which is obtained by using a left-eye image and a right-eye image included in the three-dimensional still image data for testing in the storage device. The three-dimensional image for testing includes such a first image that when the three-dimensional image for testing is viewed from a predetermined viewing area, stereoscopic images of a plurality of vertical rods disposed at different depth positions are perceived.

Figure 1:
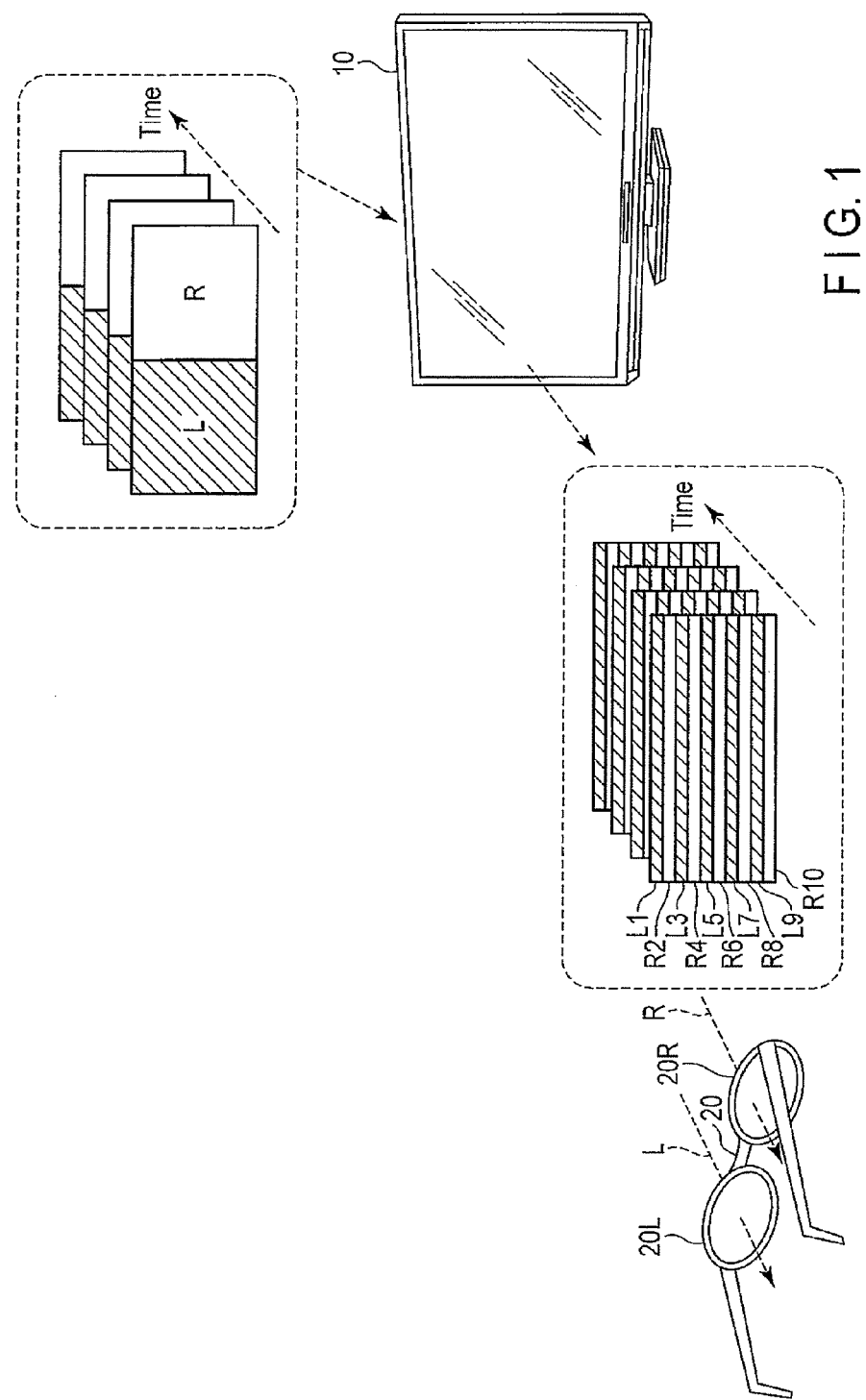
FIG. 1 is an exemplary view for describing a general operation of a three-dimensional (3D) image display apparatus according to an embodiment.

To begin with, referring to FIG. 1, a general description is given of a three-dimensional (3D) image display apparatus according to an embodiment. The 3D image display apparatus is realized, for example, as a digital television (TV) 10 which can display three-dimensional (3D) images (stereoscopic images). The digital TV 10 is configured to display, based on video content data, 3D images which is perceived as stereoscopic image when observed from a predetermined viewing area. As the video content data, use is made of, for instance, broadcast program data which is broadcast by a broadcast signal, or content data which is stored in storage media.

The digital TV 10 may be either a 3D image display apparatus of a glasses method which enables perception of stereoscopic images with use of 3D glasses, or a 3D image display apparatus of a naked-eye stereopsis method (glasses-less 3D method). This digital TV 10 is suited to, in particular, a 3D image display method in which the range of a viewing position (viewing area), where stereoscopic images can be perceived, is restricted. Examples of the 3D image display method, in which the range of the viewing area is restricted, include a polarization method (passive method) which is one of glasses methods, and glasses-less 3D method. In the polarization method, the viewing area in the up-and-down direction, relative to the display surface, is restricted. The glasses-less 3D methods include a two-view type and a multi-view type. In the multi-view type glasses-less 3D method, the amount of information is increased by using a large number of parallax images (e.g. three or more parallax images), and thereby the range in which stereoscopic images can be observed is made wider than in the two-view type glasses-less 3D method. However, even in this multi-view type glasses-less 3D method, the viewing area in the right-and-left direction, relative to the display surface, is restricted, and crosstalk will occur if the position of observation deviates to the left or right from a predetermined 3D viewing area.

In the present embodiment, the digital TV 10 has a 3D viewing position check function. The 3D viewing position check function is a function for enabling the user to easily confirm whether the present viewing position of the user is within the 3D viewing area. This 3D viewing position check function is a function that is suited to a 3D image display apparatus of the method in which the viewing area is restricted, for example, a 3D image display apparatus of the polarization method (passive method), or a 3D video display apparatus of the glasses-less 3D method.

In the description below, the structure of the digital TV 10 is described, assuming the case in which the digital TV 10 is a 3D image display apparatus using the polarization method (passive method) that is one of glasses methods.

The polarization method (passive method), as described above, is one of 3D image display methods in which the range (viewing area) of the viewing position, where stereoscopic image can be perceived, is restricted. In the 3D image display apparatus of the polarization method (passive method), a predetermined image for stereoscopic view (3D display image), which is obtained by using a left-eye video image and a right-eye video image, is displayed on the display of the digital TV 10. In the polarization method (passive method), an interleaved image, in which a left-eye image and a right-eye image are alternately arranged, is used as the 3D display image. This display may be a liquid crystal display (LCD). A polarization filter is disposed on the screen of the display (LCD). This polarization filter is a filter for making different the polarization directions of the individual horizontal lines of the display. The polarization filter polarizes, in different directions, the left-eye image, which is displayed, for example, in odd-numbered lines on the screen of the LCD, and the right-eye image, which is displayed in even-numbered lines on the screen.

A polarization filter, which is disposed on a left-eye glass part 20L of 3D glasses 20, passes only light of a polarization direction corresponding to the left-eye image. On the other hand, a polarization filter, which is disposed on a right-eye glass part 20R of the 3D glasses 20, passes only light of a polarization direction corresponding to the right-eye image. By using the 3D glasses 20 that are the polarization glasses, the user can view the left-eye image, which is displayed on the screen of the LCD, by the left eye, and the right-eye image, which is displayed on the screen of the LCD, by the right eye.

The digital TV 10 executes, for example, a live playback process for viewing broadcast program data which is received by a tuner in the digital TV 10, a recording process of recording received broadcast program data in a storage medium such as an HDD, and a playback process of playing back video content data (broadcast program data, a video title, etc.) which is recorded in a storage medium. The digital TV 10 has a two-dimensional display mode (2D display mode) and two three-dimensional display modes (3D display modes).

The 2D display mode is a display mode for displaying 2D images corresponding to normal 2D video data on the display. In the 2D display mode, the digital TV 10 displays, on the display, each of frame images of video content data that is the target of display. The 3D display modes include a 3D video display mode and a 2D/3D (2Dto3D) display mode.

The 3D video display mode is a 3D display mode for displaying 3D images corresponding to 3D-format 3D video data. As the 3D-format 3D video data, use is made of, for instance, 3D video data of a side-by-side format, or 3D video data of a top-and-bottom format. The side-by-side format is a 3D video format in which a left-eye image (L) is disposed on a left half of each frame, and a right-eye image (R) is disposed on a right half of each frame. Most of 3D broadcast program data are video content data of the side-by-side format.

When 3D-format 3D video data has been received, the digital TV 10 displays on the display a 3D display image, which is obtained by using a left-eye image and a right-eye image included in each frame of the received 3D video data. Thereby, the digital TV 10 displays 3D image corresponding to each frame of the received video content data.

For example, when the video content data that is the display target is of the side-by-side format, the digital TV 10 generates, as a 3D display image for stereoscopic view, an interleaved image in which an image (left-eye image) on the left-half area of each frame image and an image (right-eye image) on the right-half area of each frame image are alternately arranged in units of a horizontal line, and displays the interleaved image on the display. For example, a first-line image L1 in the left-eye image L is displayed in a first line of the display, a second-line image R2 in the right-eye image R is displayed in a second line of the display, a third-line image L3 in the left-eye image L is displayed in a third line of the display, and a fourth-line image R4 in the right-eye image R is displayed in a fourth line of the display.

The 2D/3D (2Dto3D) display mode is a 3D display mode for displaying 3D images by converting 2D video data to 3D video data. In the 2D/3D (2Dto3D) display mode, the digital TV 10 displays, on the display, 3D images which are obtained by converting 2D video content data that is the display target to 3D video data. Specifically, the digital TV 10 generates a left-eye image and a right-eye image from each frame image of 2D video data, by estimating the depth of each of pixels of each frame image of the 2D video data. Then, by using the left-eye image and right-eye image which have been generated from each frame image, the digital TV 10 generates an interleaved image and displays the interleaved image on the display.

In the polarization method, a 3D viewing angle in the vertical direction is relatively narrow, because of the structure in which the polarization filter is disposed on the display. The 3D viewing angle is a viewing angle at which stereoscopic images can correctly be perceived. If 3D images are observed in areas other than the area of the 3D viewing angle, it is possible that the above-described crosstalk or pseudoscopy occurs.

Referring now to FIG. 2 and FIG. 3, the 3D viewing angle of the digital TV 10 is described.

FIG. 2 is a left side view of the digital TV 10, and FIG. 3 illustrates a pixel arrangement of a vertical line in a display (LCD) 2103 of the digital TV 10. The display (LCD) 2103 of the digital TV 10 is a 3D display device which displays 3D images by a polarization method. A polarization filter 2103A is disposed on a display surface of the display (LCD) 2103. In FIG. 3, it is assumed that a left-eye image (L) is displayed in each odd-numbered line, and a right-eye image (R) is displayed in each even-numbered line. In this case, a polarization filter (L) corresponding to the left-eye image (L) is disposed at a position corresponding to each odd-numbered line on the display surface. A polarization filter (R) corresponding to the right-eye image (R) is disposed at a position corresponding to each even-numbered line on the display surface.

In FIG. 2, symbol "θ" is indicative of the 3D viewing angle in the vertical direction. The range specified by the 3D viewing angle is a viewing area (3D viewing area) in which normal stereoscopic images can be perceived. An area, where an observation position (also referred to as "viewing position") deviates upward or downward from the 3D viewing area, is a crosstalk area in which the above-described crosstalk occurs. An area, where the observation position further deviates upward or downward, is a pseudoscopy area in which the above-described pseudoscopy occurs.

The digital TV 10 comprises a tilt mechanism 11 which can vary the angle of the display (LCD) 2103. Thus, the user can adjust the viewing position so that the viewing position may be included within the 3D viewing area, by varying the angle of the display (LCD) 2103 upward or downward by the tilt mechanism 11, or by moving the height of the user's own eyes or.

Next, referring to FIG. 3, the mechanism of occurrence of crosstalk and pseudoscopy is explained. An observation position VP1 in FIG. 3 is within the 3D viewing area that is the area where normal stereoscopic images can be perceived. Light of the left-eye image is sent to the observer via the polarization filter for the left-eye image, and light of the right-eye image is sent to the observer via the polarization filter for the right-eye image. Accordingly, the observer can view the left-eye image by the left eye and the right-eye image by the right eye by using the 3D glasses 20.

An observation position VP2 is within the crosstalk area. For example, light of a pixel of a left-eye image display line is sent to the observer via the polarization filter for the left-eye image, which is disposed on the left-eye image display line. However, light of a pixel of a right-eye image display line, which neighbors the left-eye image display line, is also sent to the observer via the polarization filter for the left-eye image, which is disposed on the left-eye image display line. In this case, not only the light of the pixel of the left-eye image display line, but also the light of the pixel of the right-eye image display line is sent to the left eye of the observer via the left-eye glass part 20L of the 3D glasses 20. Consequently, even if the observer uses the 3D glasses 20, the observer views both the left-eye image and right-eye image by the left eye, and views both the left-eye image and right-eye image by the right eye. This leads to a decrease in stereoscopic effect of 3D image, a decrease in depth effect of 3D image, or appearance of double images (ghost images).

An observation position VP3 is within the pseudoscopy area. For example, light of a pixel of a left-eye image display line is sent to the observer via the polarization filter for the right-eye image, which is disposed on the right-eye image display line. In addition, light of a pixel of a right-eye image display line is sent to the observer via the polarization filter for the left-eye image, which is disposed on the left-eye image display line. In this case, the light of the pixel of the left-eye image display line is sent to the right eye of the observer via the right-eye glass part 20R of the 3D glasses 20, and the light of the pixel of the right-eye image display line is sent to the left eye of the observer via the left-eye glass part 20L of the 3D glasses 20. Hence, the observer views the left-eye image by the right eye, and the right-eye image by the left eye.

Next, referring to FIG. 4, the system configuration of the digital TV 10 is described.

The digital TV 10 comprises a tuner 224, a decoder 225, a selector 226, a signal processor 234, a controller 235, an audio output circuit 237, an operation module 247, a remote-control signal reception module 248, and a memory 249.

A digital television broadcast signal is supplied to the tuner 224 via an antenna 222 and an input terminal 223. The tuner 224 is a reception module which receives video content data (broadcast program data) which is broadcast by a digital television broadcast signal. The tuner 224 receives a signal of a desired channel, and demodulates the received signal. A digital video signal, which is output from the tuner 224, is decoded by the decoder 225, and the decoded digital video signal is supplied to the selector 226.

An external device is connected to an input terminal 233 for digital signals. A digital video signal, which is supplied to the input terminal 233 for digital signals, is directly supplied to the selector 226.

The selector 226 selects one digital video signal from two kinds of input digital video signals, and supplies the selected signal to the signal processor 234. The signal processor 234 separates an audio signal and a video signal from the input digital video signal, and executes predetermined signal processes on the audio signal and the video signal. The audio signal is subjected to signal processes, such as an audio decoding process, a sound quality adjusting process, a mixing process, etc. The video signal is subjected to a color adjusting process, an image quality adjusting process, etc.

Figure 5:
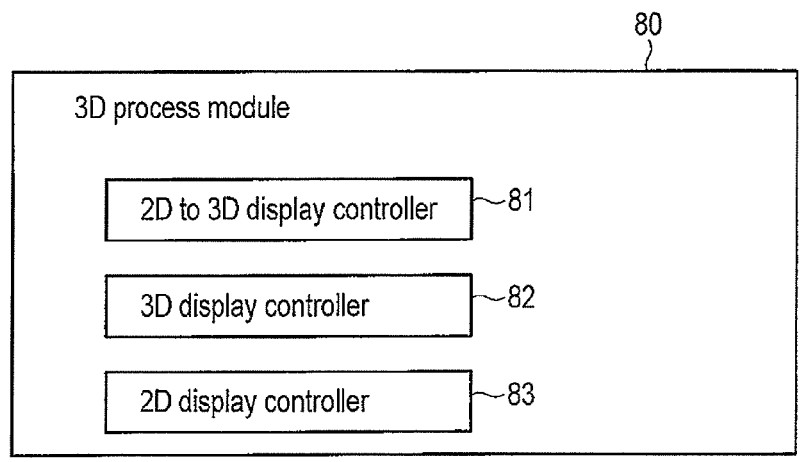
FIG. 5 is an exemplary view illustrating the structure of a 3D processing module which is provided in the 3D image display apparatus of the embodiment.

The signal processor 234 comprises a 3D processing module 80. The 3D processing module 80 causes the LCD 2103 to display, based on the video content data, 3D images which are perceived as stereoscopic images when observed from a predetermined viewing area. For example, the 3D processing module 80 generates an interleaved image in which a left-eye image and a right-eye image included in each frame of the video content data are alternately arranged in units of a horizontal line, and causes the LCD 2103, on the display surface of which the polarization filter 2103A is disposed, to display this interleaved image. The signal of the interleaved image is sent to the LCD 2103 via a video output circuit 239. As shown in FIG. 5, the 3D processing module 80 may include a 2Dto3D display controller 81, a 3D video display controller 82 and a 2D display controller 83.

The 2Dto3D display controller 81 is a display control module for displaying video content data in a 2Dto3D display mode. When the 2Dto3D display mode has been selected by the user, the 2Dto3D display controller 81 estimates depth values of the pixels of each frame image of the video content data that is the target of display, and generates a plurality of parallax images, for example, two parallax images, i.e. a left-eye image and a right-eye image, based on the estimated depth values. The 2Dto3D display controller 81 displays a 3D display image, which is obtained by using the generated left-eye image and right-eye image, on the display surface of the LCD 2103. The 3D display image is an image which is obtained by re-arranging (reconstructing) the left-eye image and right-eye image, based on a predetermined pixel arrangement for 3D display. The 3D display image (reconstructed image) differs depending on a 3D method that is used. In the case of the polarization method, an image, in which a left-eye image and a right-eye image are alternately arranged in units of a horizontal line, as described above, is used as the 3D display image.

Specifically, when the LCD 2103 is the 3D display device of the polarization method, as described above, an interleaved image, in which a left-eye image and a right-eye image are alternately arranged in units of a horizontal line, is generated, and this interleaved image is displayed on the display surface of the LCD 2103.

If the LCD 2103 is a 3D display which supports the two-view type glasses-less method, for example, a 3D display image, which is obtained by using a left-eye image and a right-eye image of video data that is the target of display, is displayed on the display surface of the LCD 2103. In this case, as the 3D display image, use is made of an image (also referred to as "composite image") in which a left-eye image and a right-eye image are re-arranged such that the mutually associated pixels of the left-eye image and right-eye image neighbor in the horizontal direction. In addition, if the LCD 2103 is a 3D display which supports the multi-view type glasses-less method, an image (also referred to as "composite image"), in which a plurality of parallax images are re-arranged such that the mutually associated pixels of the plural parallax images neighbor in the horizontal direction, is used as the 3D display image. For example, when nine parallax images are used, the associated nine pixels of the nine parallax images are arranged at nine pixel positions which neighbor in the horizontal direction.

The 3D video display controller 82 is a display control module which displays 3D images, based on 3D-format 3D video content data. As the 3D-format 3D video content data, use is made of 3D video data of the side-by-side format or 3D video data of the top-and-bottom format. When the 3D display mode has been selected by the user, the 3D video display controller 82 displays 3D image corresponding to each of frames of the 3D video content data. That is, the 3D video display controller 82 displays 3D image by using, as a left-eye image and a right-eye image, two images on two areas of each frame image of the video content data that is the display target (e.g. a left-side image and a right-side image of each frame image). In this case, 3D display image (an interleaved image or a composite image), which is obtained by using the left-eye image and right-eye image, is displayed on the display surface of the LCD 2103.

The 2D display controller 83 is a display control module used in the 2D display mode. When the 2D display mode has been selected by the user, the 2D display controller 83 displays each frame image of the video content data of the display target, as such, on the LCD 2103.

In FIG. 4, the audio signal is converted to an analog audio signal by the audio output circuit 237, and the analog audio signal is output to a speaker device 2102 via an output terminal 238.

In the digital TV 10, various operations including the operation of receiving video signals are comprehensively controlled by the controller 235. The controller 235 incorporates a CPU (central processing unit), etc. The controller 235 controls the respective components in the digital TV 10, in accordance with an operation of the operation module 247 by the user, or in accordance with a remote-control signal from a remote-controller 2104, which is received by the remote-control signal reception module 248.

The controller 235 is connected to the memory 249. The memory 249 is composed of a nonvolatile memory. The memory 249 pre-stores 3D viewing position check pattern image data, in order to enable the observer (user) to confirm whether the present viewing position is within the 3D viewing area. The 3D viewing position check pattern image data is 3D still image data for testing for displaying 3D image. The 3D still image data for testing is, for example, 3D graphics data for displaying 3D image, and includes a left-eye image and a right-eye image. The 3D still image data for testing may be a still image file of an MP (Multi pictures) format. Left-eye image data and right-eye image data can independently be included in the still image file of the MP (Multi pictures) format. Needless to say, a single 3D display image which is obtained by using a left-eye image and a right-eye image (e.g. interleaved image data in which a left-eye image and a right-eye image are alternately arranged in units of a horizontal line) may be stored in the memory 249 as 3D still image data for testing.

Figure 6:
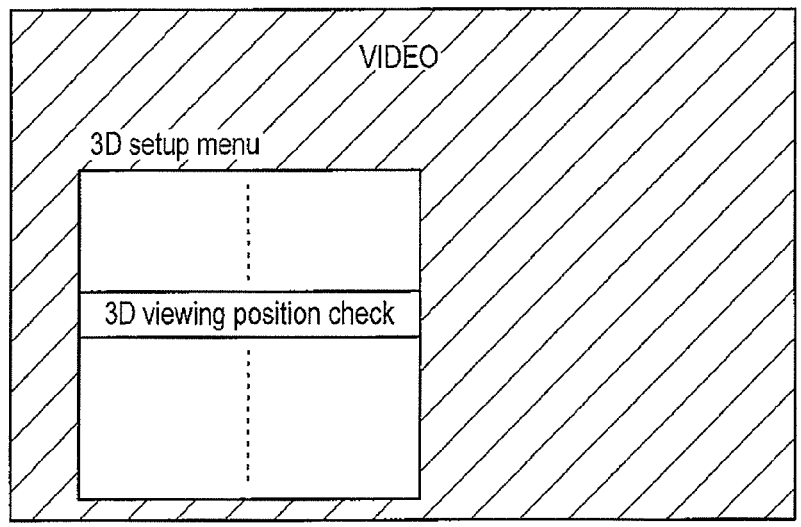
FIG. 6 is a view illustrating an example of a 3D setup menu which is displayed on a display of the 3D image display apparatus of the embodiment.

The controller 235 includes a menu display module 235A and a 3D check pattern display module 235B. The menu display module 235A displays, on the LCD 2103, a menu for various settings relating to video adjustment and various settings relating to 3D viewing. As shown in FIG. 6, the menu relating to settings of 3D viewing (3D setup menu) includes a "3D viewing position check" menu. The 3D check pattern display module 235B is a display control module configured to display, when an event of requesting a check of a viewing position occurs, 3D image for testing, based on the 3D viewing position check pattern image data (3D still image data for testing) which is pre-stored in the memory 249. When the "3D viewing position check" menu has been selected by the user's operation of the remote-controller 2104, the 3D check pattern display module 235B displays a 3D viewing position check pattern, which is 3D image for testing, on the LCD 2103, based on the 3D viewing position check pattern image data (3D still image data for testing) which is pre-stored in the memory 249.

Figure 7:
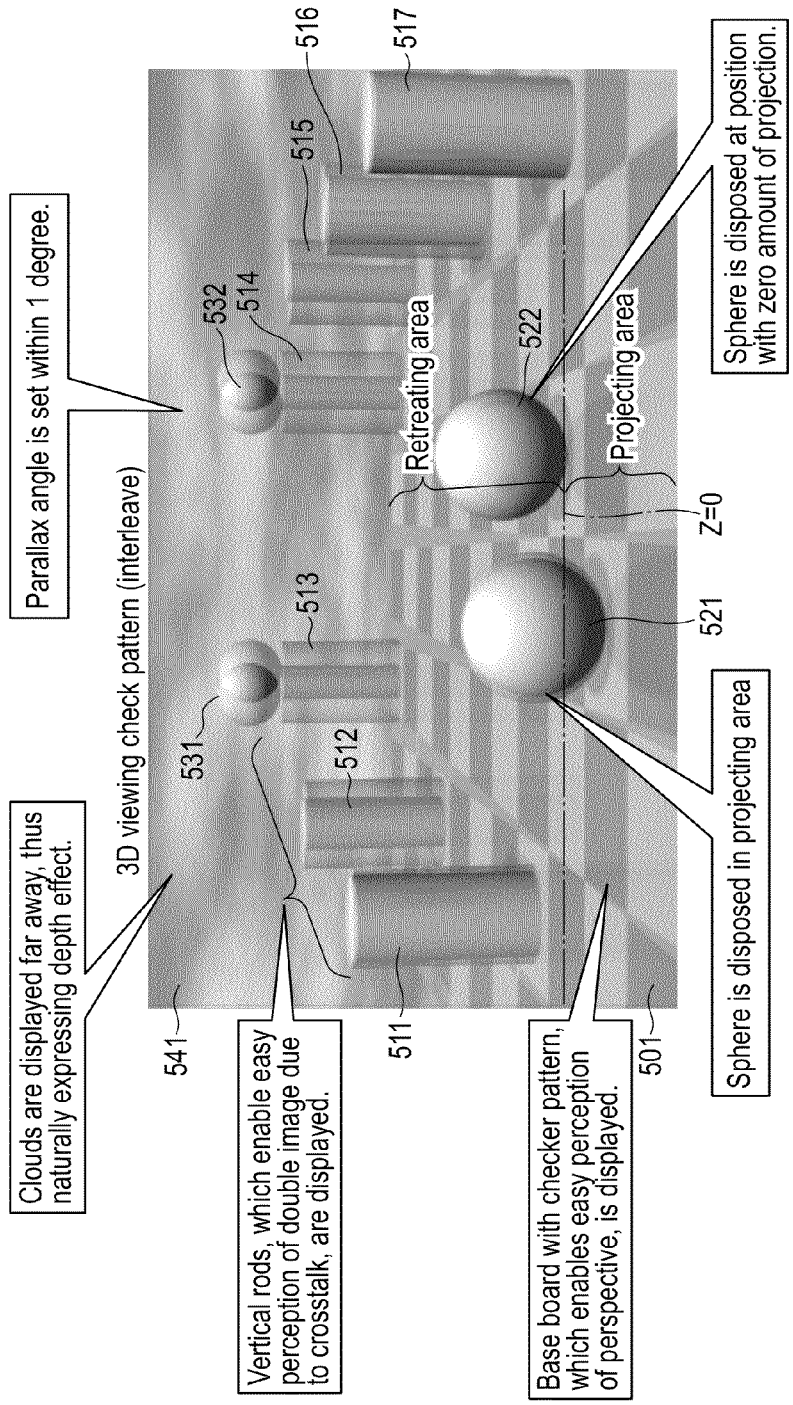
FIG. 7 is a view illustrating an example of a 3D viewing check pattern image (3D image for testing) which is displayed by the 3D image display apparatus of the embodiment.

Next, referring to FIG. 7, a description is given of an example of the 3D viewing position check pattern that is 3D image for testing. What is shown in FIG. 7 is a 3D display image, which is displayed on the display surface of the LCD 2103. The case is now assumed that the 3D display image is a 3D display image which corresponds to the polarization method, i.e., the interleaved image.

Figure 8:
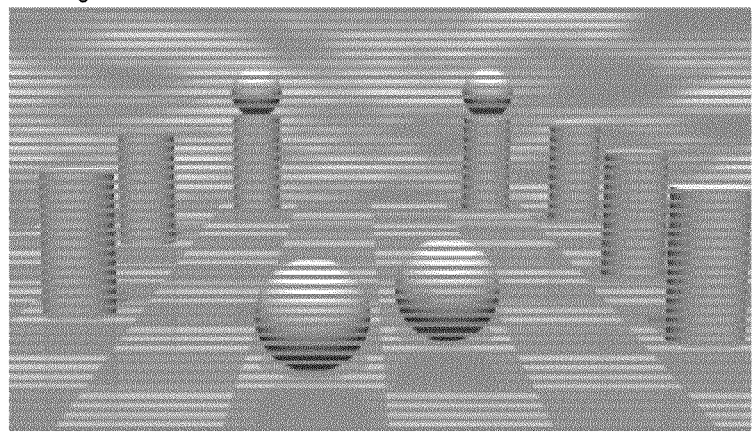
FIG. 8 is an exemplary view for describing lines in a left-eye image which is used for generating the 3D viewing check pattern image of FIG. 7.
Figure 9:
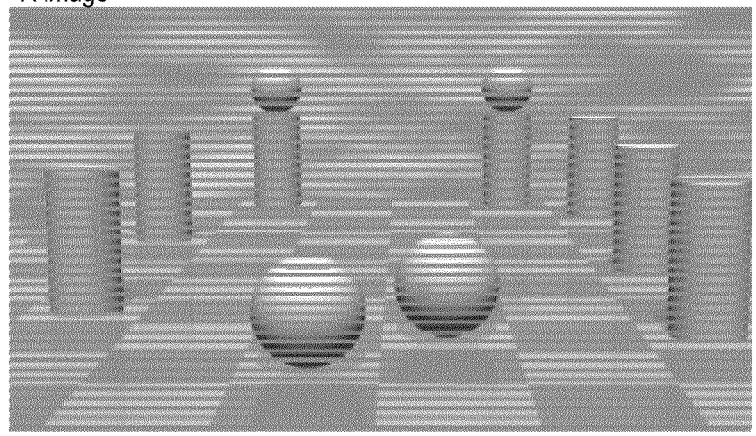
FIG. 9 is an exemplary view for describing lines in a right-eye image which is used for generating the 3D viewing check pattern image of FIG. 7.

The 3D display image (3D viewing position check pattern) of FIG. 7 is an image which is observed when the display surface of the LCD 2103 is viewed without using the 3D glasses 20. In the 3D display image (3D image for testing) of FIG. 7, the state in which a right-eye image and a left-eye image are interleaved is not clearly understandable. However, in fact, an image, which is obtained by alternately arranging the right-eye image and left-eye image of the 3D viewing position check pattern image data in units of a horizontal line, is displayed on the display surface of the LCD 2103. Specifically, the image (3D viewing position check pattern) of FIG. 7 is constructed, for example, by alternately arranging, in units of a line, an image (FIG. 8) of each of odd-numbered lines in a left-eye image (L image) and an image (FIG. 9) of each of even-numbered lines in a right-eye image (R image). Needless to say, the image for 3D display may be constructed by alternately arranging the image of each of even-numbered lines in the L image and the image of each of odd-numbered lines in the R image.

When this 3D display image (3D viewing position check pattern) is observed through the 3D glasses 20 in the 3D viewing area, normal stereoscopic image of each of a plurality of objects included in the 3D display image can be perceived. In addition, when the 3D display image (3D viewing position check pattern) is observed through the 3D glasses 20 at a position different from the 3D viewing area, crosstalk occurs and a double image, or the like, of each of the plural objects is perceived. In other words, if this 3D display image is observed through the 3D glasses 20 at a position different from the 3D viewing area, an image, which is substantially identical to the 3D display image that is actually displayed on the display surface of the LCD 2103, that is, an image, which is substantially identical to an image that is observed when the display surface of the LCD 2103 is viewed without using the 3D glasses 20, is perceived.

The 3D display image (3D viewing position check pattern) is designed such that a position indicated by a broken line agrees with a depth position (depth Z=0) of the display surface of the LCD 2103. The depth position (depth Z=0) of the display surface is a position at which the amount of projection of perceived stereoscopic image is zero. An image part on a lower side of the broken line in the 3D display image is an image (projecting area) which is perceived as stereoscopic image part that is located in front of the display surface. In addition, an image part on an upper side of the broken line is an image part (retreating area) which is perceived as stereoscopic image that is located behind the display surface. The depth space of the 3D viewing position check pattern includes the projecting area and retreating area, and the ratio of the projecting area to the depth space is set to be less than the ratio of the retreating area to the depth space. In addition, taking safety into account, the parallax angle of the 3D viewing position check pattern is set to be within 1 degree.

The 3D viewing position check pattern displays a plurality of vertical rods (columns) 511, 512, 513, 514, 515, 516 and 517. Each of the vertical rods 511, 512, 513, 514, 515, 516 and 517 is an object including line segments extending in the vertical direction (i.e. the direction perpendicular to the horizontal line of the display surface). Each of the vertical rods 511, 512, 513, 514, 515, 516 and 517 may be, for instance, a cylinder. Needless to say, each of the vertical rods 511, 512, 513, 514, 515, 516 and 517 may be a prism.

When crosstalk occurs, the positions of a left-eye image component and a right-eye image component corresponding to an identical object included in 3D image appear to be horizontally displaced (double images). The reason for this is that in the 3D display image, a left-eye image component and a right-eye image component corresponding to an identical object are disposed at positions which are horizontally displaced by an amount corresponding to the parallax. In the present embodiment, in order to make it easy to confirm the occurrence of double images, the plural vertical rods 511, 512, 513, 514, 515, 516 and 517 are displayed. The vertical rod is an object having such a shape that a double image due to crosstalk can easily be confirmed. Specifically, the 3D display image includes such image that when the image for stereoscopic is observed from the 3D viewing area, stereoscopic image of each of the plural vertical rods 511, 512, 513, 514, 515, 516 and 517 is perceived, and when the 3D display image is observed from a position different from the 3D viewing area, a double image of each of the plural vertical rods 511, 512, 513, 514, 515, 516 and 517 is perceived.

Figure 10:
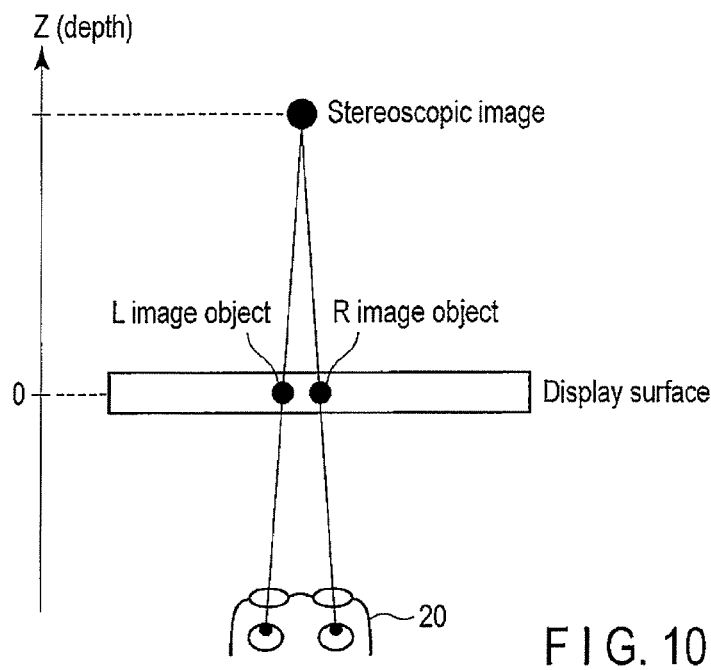
FIG. 10 is a view illustrating an example of the relationship between a parallax on a display surface and a depth position of a perceived stereoscopic image in the 3D image display apparatus of the embodiment.
Figure 11:
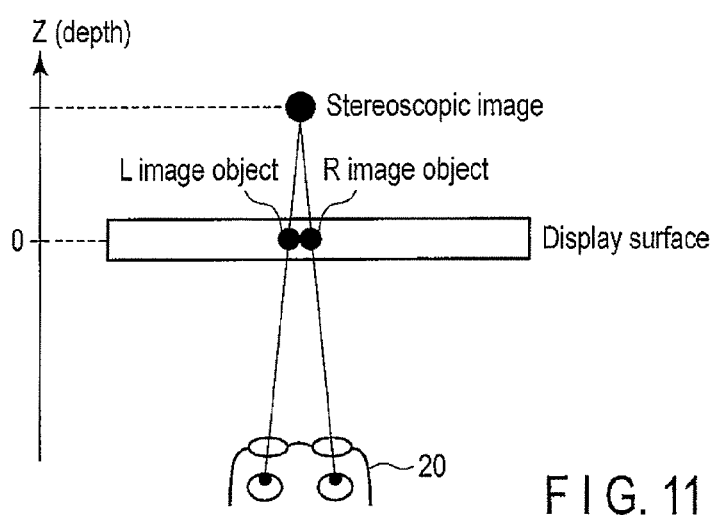
FIG. 11 is a view illustrating another example of the relationship between the parallax on the display surface and the depth position of a perceived stereoscopic image in the 3D image display apparatus of the embodiment.
Figure 12:
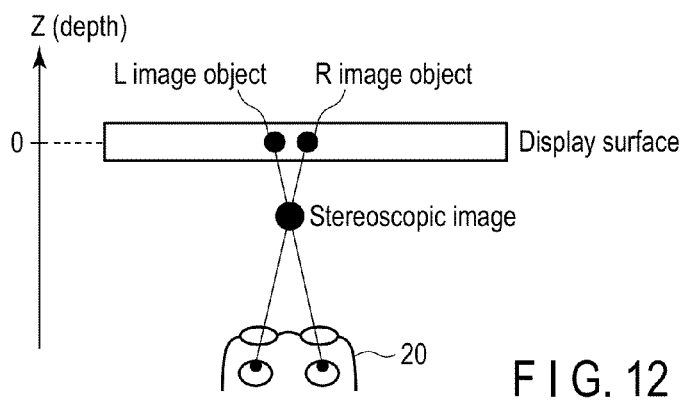
FIG. 12 is a view illustrating still another example of the relationship between the parallax on the display surface and the depth position of a perceived stereoscopic image in the 3D image display apparatus of the embodiment.

The 3D display image is designed such that the vertical rods 511, 512 and 513 are displayed at different depth positions. As is understood from FIG. 10 and FIG. 11, as the depth position of an object is farther from the display surface, the parallax on the display surface between the left-eye image component and the right-eye image component of this object is greater. In addition, as is understood from FIG. 12, a left-eye image component and a right-eye image component of an object, whose stereoscopic image is perceived in the projecting area, are disposed such that the left-eye image component is positioned on the right side and the right-eye image component is positioned on the left side.

Figure 13:
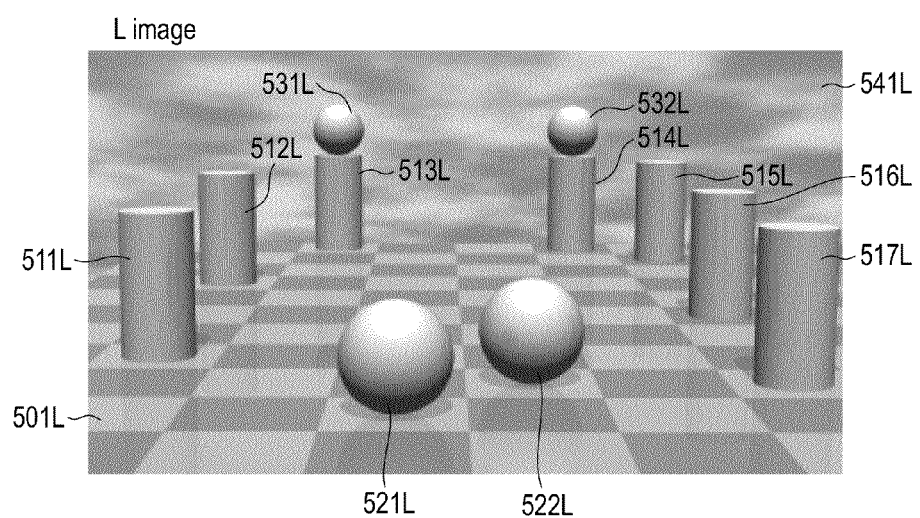
FIG. 13 is an exemplary view illustrating contents of objects which are displayed on a left-eye image that is used for displaying the 3D viewing check pattern image of FIG. 7.
Figure 14:
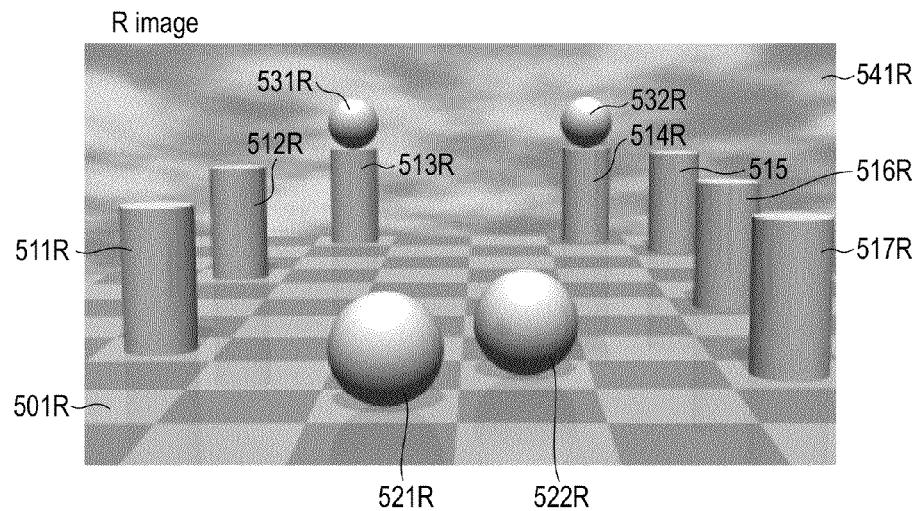
FIG. 14 is an exemplary view illustrating contents of objects which are displayed on a right-eye image that is used for displaying the 3D viewing check pattern image of FIG. 7.
Figure 15:
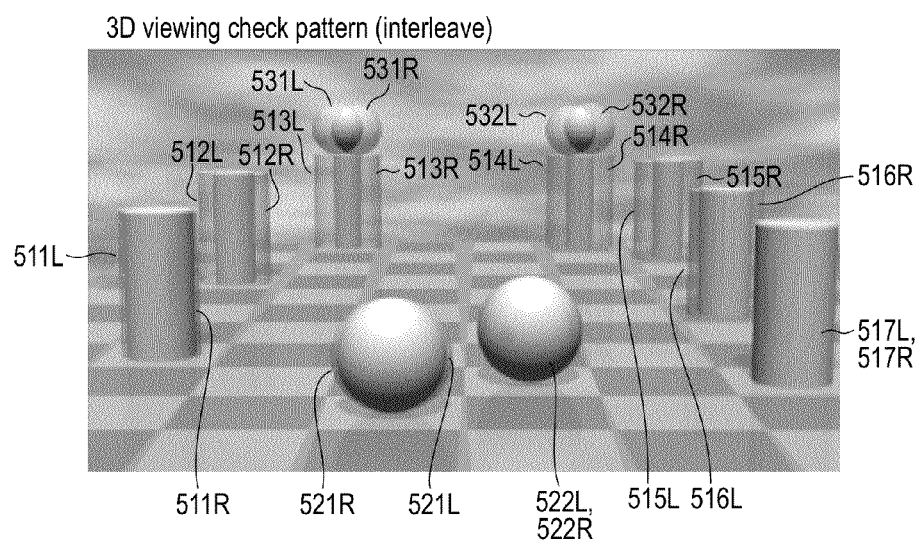
FIG. 15 is an exemplary view illustrating contents of objects which are displayed on a 3D viewing check pattern image that is obtained by using the left-eye image of FIG. 13 and the right-eye image of FIG. 14.

In the 3D display image of FIG. 7, the depth positions of the vertical rods 511, 512 and 513 are different from each other. The vertical rod 513 exists at a depth position farthest from the display surface, that is, in the vicinity of a rearmost depth position in the depth space. The vertical rod 512 exists at a depth position which is second farthest from the display surface, and the vertical rod 511 exits at a depth position closest to the display surface. Accordingly, the parallax on the display surface between the left-eye image component and right-eye image component corresponding to the vertical rod 513, of all the vertical rods 511, 512 and 513, is greatest. In other words, when the 3D display image (3D image for testing) is observed from the 3D viewing area, the stereoscopic images of the plural vertical rods 511, 512 and 513 disposed at different depth positions are perceived. However, when the 3D display image (3D image for testing) is observed from a position different from the 3D viewing area, double images of the plural vertical rods 511, 512 and 513 are perceived. The double images of the plural vertical rods 511, 512 and 513 have different degrees of displacement between the left and right image components. FIG. 13 to FIG. 15 illustrate, in an easy-to-understand manner, the left-eye image component and right-eye image component of each object in the 3D display image of FIG. 7. FIG. 13 and FIG. 14 show the left-eye image (L image) and right-eye image (R image) which constitute the 3D display image of FIG. 7.

FIG. 15 shows the same image as the 3D display image of FIG. 7. In FIG. 13 to FIG. 15, symbol "L" that is added to each reference numeral indicates a left-eye image component, and symbol "R" that is added to each reference numeral indicates a right-eye image component. From FIG. 13 to FIG. 15, it will be understood that the amounts of displacement of the double images corresponding to the plural vertical rods 511, 512 and 513 are different from each other, that is, the parallax on the display surface between the left-eye image component and right-eye image component is different between the vertical rods.

The parallax on the display surface between a left-eye image component 513L and a right-eye image component 513R of the vertical rod 513 is greatest. By simultaneously observing the vertical rods 511, 512 and 513 having different amounts of displacement of double images, the user can easily confirm that the stereoscopic image, which the user is currently viewing, is defective stereoscopic image, or in other words, that the user fails to enjoy 3D viewing.

When 3D image of a complex picture pattern, such as 3D video corresponding to real-scene video, is displayed, even if a double image occurs, the user may not easily understand whether the displayed image is a double image or a picture pattern. In the present embodiment, since the plural vertical rods 511, 512 and 513 have simple shapes, such as cylindrical shapes, the user can easily confirm the occurrence of a double image due to crosstalk.

The 3D display image (3D image for testing) of FIG. 7 also displays a plurality of objects (spheres) 521, 522, 531 and 532 having spherical shapes. The 3D display image is designed such that the object (sphere) 521 is disposed at a depth position (projecting area) that is located in front of the display surface, and the object (sphere) 522 is disposed at substantially the same depth position as the display surface. Specifically, the 3D display image includes such a image that when the 3D display image is observed from the 3D viewing area, stereoscopic image of the object (sphere) 521, which is disposed at a depth position in front of the display surface, and the stereoscopic image of the object (sphere) 522, which is disposed at substantially the same depth position as the display surface, are perceived. By simultaneously observing the object 521 that is located in the projecting area and the object 522 that has the same shape as the object 521 and is located at substantially the same depth position as the display surface, the user can more easily perceive that the stereoscopic image of the object 521 is located in front of the display surface, and can easily confirm that stereoscopic viewing is successfully effected.

In the meantime, it should suffice if the objects 521 and 522 have the same shape, and it is not necessary that the objects 521 and 522 be spheres.

Furthermore, the 3D display image (3D viewing position check pattern) of FIG. 7 displays a bottom surface (also referred to as "base board" or "checker board") 501 having a picture pattern of a checker pattern. The bottom surface 501 is a flat object such as a floor surface or ground. The 3D display image is designed such that the bottom surface (base board) 501 of the checker pattern extends between a depth position that is located in front of the display surface and a depth position that is located behind the display surface (the rearmost depth position in this example). Specifically, the 3D display image includes such a image that when the 3D display image is observed from the 3D viewing area, stereoscopic image of the bottom surface (base board) 501 of the checker pattern, which extends between the depth position in front of the display surface and the depth position behind the display surface (the rearmost depth position in this example), is perceived. To be more specific, the bottom surface (base board) 501 of the checker pattern extends from the foremost depth position in the depth space of the 3D viewing position check pattern to the rearmost depth position in this depth space.

The checker pattern is a picture pattern with which perspective can easily be perceived. Thus, the stereoscopic effect of the entire 3D display image can be enhanced by displaying the bottom surface (base board) 501 of the checker pattern as the object representing the floor surface or ground. The objects 511 to 517, 521 and 522 are arranged on the bottom surface (base board) 501 of the checker pattern as if they were pieces on a checkerboard.

Moreover, the 3D display image (3D viewing position check pattern) of FIG. 7 displays clouds as the background. The background of clouds is located at the rearmost depth position in the depth space of the 3D viewing position check pattern. By displaying the clouds, the depth effect can naturally be expressed.

Although there are differences among individuals with respect to the stereoscopic viewing, the 3D viewing position check pattern of the present embodiment displays the plural vertical rods, with which the occurrence of a double image can easily be confirmed, at different depth positions, and also displays the picture pattern of the checker pattern, with which perspective can easily be perceived, over a relatively wide depth range. Moreover, the 3D viewing position check pattern displays two objects (spheres) of the same shape at a depth position corresponding to the projecting area and at substantially the same depth position as the display surface, so that the object which is located on the front side may clearly be perceived. Therefore, it is possible to enable various users to easily confirm whether 3D viewing (stereoscopic viewing) is successfully effected.

In addition, in the present embodiment, since 3D viewing position check pattern image data for displaying the 3D display image is pre-stored in the memory 249 that is the storage device, the 3D display image (3D viewing position check pattern) can easily be displayed anytime. Besides, since the 3D display image (3D viewing position check pattern) is a still image, the stereoscopic image, which is perceived by the user, does not change, unless the viewing position is moved. Therefore, by observing the 3D viewing position check pattern, the user can easily confirm whether the present viewing position is within the 3D viewing area, while moving the positions of his/her eyes or varying the angle of the display (LCD) 2103 by the tilt mechanism 11.

Figure 16:
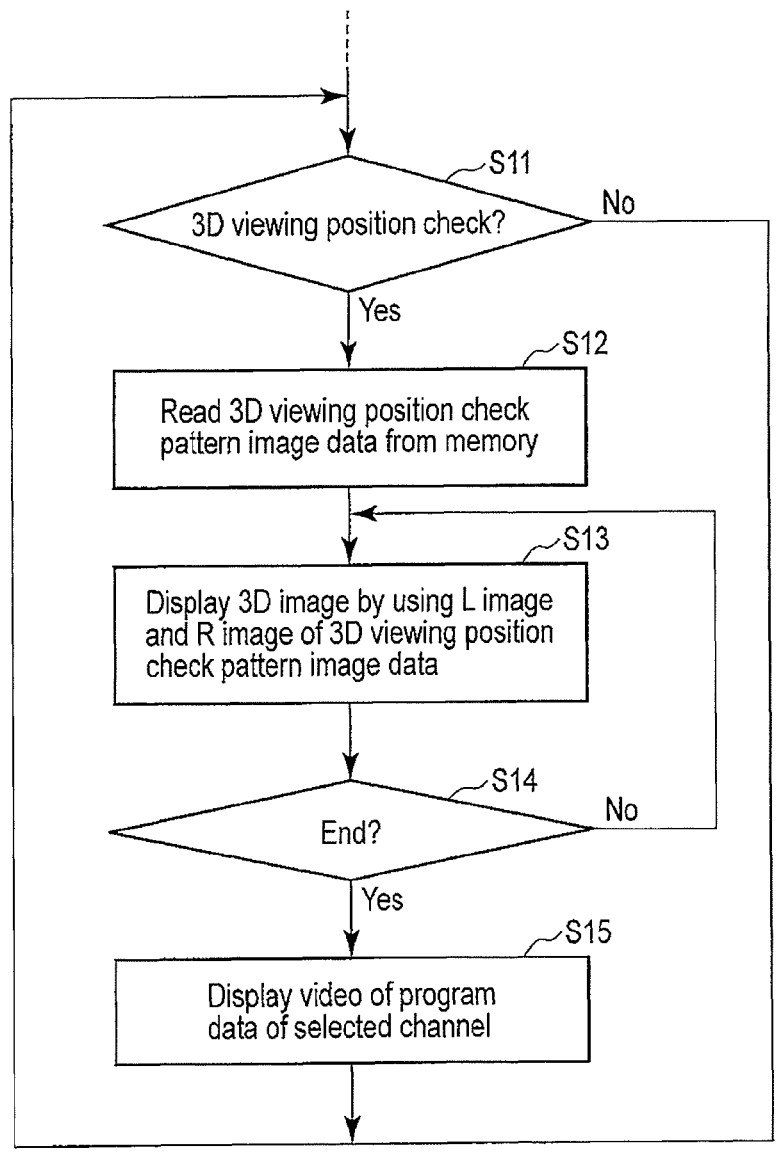
FIG. 16 is an exemplary flow chart illustrating a 3D viewing check pattern image display operation which is executed by the 3D image display apparatus of the embodiment.

Next, referring to a flow chart of FIG. 16, a description is given of the procedure of a viewing position check method using the 3D viewing position check pattern.

When the "3D viewing position check" menu has been selected by the user's operation of the remote-controller 2104, the controller 235 detects the occurrence of an event of requesting a check of a 3D viewing position (YES in step S11). The controller 235 reads the 3D viewing position check pattern image data which is stored in the memory 249 (step S12). Then, the controller 235 displays on the LCD 2103 a 3D display image (3D viewing position check pattern image) by using a left-eye image (L image) and a right-eye image (R image) of the 3D viewing position check pattern image data (step S13). In step S13, the controller 235 displays on the LCD 2103 a 3D display image (an interleaved image in the case of using a display of the polarization method) which is obtained by using a left-eye image and a right-eye image in the 3D viewing position check pattern image data.

For example, if an "end" button or "decision" button of the remote-controller 2104 has been operated by the user, the controller 235 detects the occurrence of an event of requesting the end of the check of the 3D viewing position (YES in step S14). In this case, the controller 235 terminates the display of the 3D viewing position check pattern image and displays the video of broadcast program data of the currently selected channel on the LCD 2103 (step S15). In step S15, the video of broadcast program data is displayed in the above-described 2D display mode, 3D display mode or 2Dto3D display mode.

In the present embodiment, the 3D viewing position check pattern (3D video for testing) is displayed in response to the occurrence of the event of requesting the check of the 3D viewing position. In this sense, the event of requesting the check of the 3D viewing position may be said to be an event of requesting display of the 3D viewing position check pattern (3D video for testing).

As has been described above, according to the present embodiment, the 3D still image data for testing (3D viewing position check pattern image data) is prestored in storage device. When the event of requesting the check of the viewing position has occurred, the 3D image for testing is displayed based on the 3D still image data for testing. Since the 3D image for testing includes such an image that when the 3D image is observed from a predetermined area, stereoscopic images of the plural vertical rods disposed at different depth positions are perceived. Thus, when the viewing position is displaced to a position different from the predetermined area, the occurrence of a double image can easily understandably be presented to the user. Therefore, the user is enabled to easily confirm whether the present viewing position is within the 3D viewing area.

In the present embodiment, the description has been mainly given of the case in which the embodiment is applied to the polarization-type 3D image display apparatus. However, since the 3D viewing area also occurs in the case of a 3D image display apparatus of the naked-eye method, the structure of the embodiment, which displays 3D image for testing, may be applied to a 3D image display apparatus of a two-view type naked-eye method or a 3D image display apparatus of a multi-view type naked-eye method.

When the 3D image display apparatus of the two-view type naked-eye method is used, an image (composite image), in which a left-eye image and a right-eye image are re-arranged such that the mutually associated pixels of the left-eye image (L image) and right-eye image (R image) in the 3D viewing position check pattern image data neighbor in the horizontal direction, may be generated as a 3D display image for stereoscopic view, and this 3D display image may be displayed on the display. Needless to say, this composite image may be prestored in the storage device as one still image data. In this case, the process of generating the 3D display image is needless. The same design as shown in FIG. 7 may be used as the design of the 3D viewing position check pattern image data.

The 3D image display apparatus of the multi-view type naked-eye method is configured to display 3D image by using a large number of parallax images (e.g. three or more parallax images). Thus, when the structure of the embodiment, which displays 3D image for testing, is applied to the 3D image display apparatus of the multi-view type naked-eye method, 3D still image data for testing, which includes a large number of parallax images, may be prestored in the storage device of the digital TV 10.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit the inventions. The accompanying claims and their equivalents are intended to cover such forms or modifications as would fall within the scope and spirit of the inventions.

What is claimed is:

1. A three-dimensional image display apparatus comprising:
a receiver configured to receive video content data;
a signal processor configured to display a three-dimensional image corresponding to each of frames of the received video content data, by displaying on a display a three-dimensional display image which is obtained by using a left-eye image and a right-eye image included in each of the frames of the received video content data;
a nonvolatile memory configured to store three-dimensional still image data for testing, the three-dimensional still image data comprising a left-eye image and a right-eye image; and
a controller configured to display, when an event of requesting a check of a viewing position occurs, a three-dimensional image for testing, by displaying on the display a three-dimensional display image which is obtained by using the left-eye image and the right-eye image included in the three-dimensional still image data for testing,
wherein the three-dimensional image for testing includes such a first image that when the three-dimensional image for testing is viewed from a predetermined viewing area, (i) stereoscopic images of a plurality of vertical rods disposed at different depth positions, (ii) a stereoscopic image of a first object having a first shape, which is disposed at a depth position in front of a display surface, and (iii) a stereoscopic image of a second object having the first shape, which is disposed at substantially the same depth position as the display surface, are simultaneously perceived,
wherein the plurality of vertical rods, the first object and the second object are different objects in the three-dimensional image for testing, and
wherein the three-dimensional image for testing comprises (1) a lower side image area which is perceived as a stereoscopic image part located in a first depth space in front of the display surface, and (2) an upper side image area which is perceived as a stereoscopic image part located in a second depth space behind the display surface, the stereoscopic image of the first object being disposed on the lower side image area, the stereoscopic images of the plurality of vertical rods being disposed at different depth positions on the upper side image area.

2. The three-dimensional image display apparatus of claim 1,
wherein the three-dimensional image for testing further includes such a second image that when the three-dimensional image for testing is viewed from the predetermined viewing area, a stereoscopic image of a bottom surface having a picture pattern of a checker pattern, which extends between a depth position in front of a display surface of the display and a depth position behind the display surface, is perceived, and
wherein the stereoscopic image of the bottom surface comprises a first stereoscopic image part which is perceived as a stereoscopic image part located in the first depth space in front of the display surface and a second stereoscopic image part which is perceived as a stereoscopic image part located in the second depth space behind the display surface, the first stereoscopic image part being disposed on the lower side image area, the second stereoscopic image part being disposed on the upper side image area.

3. The three-dimensional image display apparatus of claim 1,
  wherein the three-dimensional image display apparatus is configured to display three-dimensional images by a polarization method, and
  wherein the controller is configured to display an interleaved image in which the left-eye image and the right-eye image of the three-dimensional still image data for testing are alternately arranged in units of a horizontal line, on the display as the three-dimensional display image.

4. The three-dimensional video display apparatus of claim 1,
  wherein each of the plurality of vertical rods is a cylindrical object.

5. The three-dimensional video display apparatus of claim 2,
  wherein the plurality of vertical rods, the first object and the second object are disposed on the bottom surface having the picture pattern of the checker pattern.

6. A three-dimensional image display apparatus comprising:
  a receiver configured to receive video content data;
  a signal processor configured to display three-dimensional images, based on the received video content data;
  a nonvolatile memory configured to store three-dimensional still image data for testing, the three-dimensional still image data comprising a left-eye image and a right-eye image; and
  a controller configured to display, when an event of requesting a check of a viewing position occurs, a three-dimensional image for testing, based on the three-dimensional still image data for,
  wherein the three-dimensional image for testing includes such a first image that when the three-dimensional image for testing is viewed from a predetermined viewing area, (i) stereoscopic images of a plurality of vertical rods disposed at different depth positions, (ii) a stereoscopic image of a first object having a first shape, which is disposed at a depth position in front of a display surface, and (iii) a stereoscopic image of a second object having the first shape, which is disposed at substantially the same depth position as the display surface, are simultaneously perceived,
  wherein the plurality of vertical rods, the first object and the second object are different objects in the three-dimensional image for testing, and
  wherein the three-dimensional image for testing comprises (1) a lower side image area which is perceived as a stereoscopic image part located in a first depth space in front of the display surface, and (2) an upper side image area which is perceived as a stereoscopic image part located in a second depth space behind the display surface, the stereoscopic image of the first object being disposed on the lower side image area, the stereoscopic images of the plurality of vertical rods being disposed at different depth positions on the upper side image area.

7. A viewing position check method for a three-dimensional video display apparatus configured to display three-dimensional images, comprising:
  detecting occurrence of an event of requesting a check of a viewing position; and
  displaying, when the occurrence of the event is detected, a three-dimensional image for testing on a display by using a left-eye image and a right-eye image of three-dimensional still image data for testing which is stored in a nonvolatile memory in the three-dimensional image display apparatus,
  wherein the three-dimensional image for testing includes such a first image that when the three-dimensional image for testing is viewed from a predetermined viewing area, (i) stereoscopic images of a plurality of vertical rods disposed at different depth positions, (ii) a stereoscopic image of a first object having a first shape, which is disposed at a depth position in front of a display surface, and (iii) a stereoscopic image of a second object having the first shape, which is disposed at substantially the same depth position as the display surface, are simultaneously perceived,
  wherein the plurality of vertical rods, the first object and the second object are different objects in the three-dimensional image for testing, and
  wherein the three-dimensional image for testing comprises (1) a lower side image area which is perceived as a stereoscopic image part located in a first depth space in front of the display surface, and (2) an upper side image area which is perceived as a stereoscopic image part located in a second depth space behind the display surface, the stereoscopic image of the first object being disposed on the lower side image area, the stereoscopic images of the plurality of vertical rods being disposed at different depth positions on the upper side image area.

8. The viewing position check method of claim 7,
  wherein the three-dimensional image for testing further includes such a second image that when the three-dimensional image for testing is viewed from the predetermined viewing area, a stereoscopic image of a bottom surface having a picture pattern of a checker pattern, which extends between a depth position in front of a display surface and a depth position behind the display surface, is perceived, and
  wherein the stereoscopic image of the bottom surface comprises a first stereoscopic image part which is perceived as a stereoscopic image part located in the first depth space in front of the display surface and a second stereoscopic image part which is perceived as a stereoscopic image part located in the second depth space behind the display surface, the first stereoscopic image part being disposed on the lower side image area, the second stereoscopic image part being disposed on the upper side image area.

9. A three-dimensional image display apparatus comprising:
  a receiver configured to receive video content data;
  a signal processor configured to display a three-dimensional image corresponding to each of frames of the received video content data, by displaying on a display a three-dimensional display image which is obtained by using a left-eye image and a right-eye image included in each of the frames of the received video content data;
  a nonvolatile memory configured to store three-dimensional still image data for testing, the three-dimensional still image data comprising a left-eye image and a right-eye image; and
  a controller configured to display, when an event of requesting a check of a viewing position occurs, a three-dimensional image for testing, by displaying on the display a three-dimensional display image which is obtained by using the left-eye image and the right-eye image included in the three-dimensional still image data for testing, wherein the three-dimensional image for testing includes such a first image that when the three-dimensional image for testing is viewed from a predetermined viewing area, a stereoscopic image of a bottom surface having a picture pattern of a checker pattern, which extends between a depth position in front of a display surface of the display and a depth position behind the display surface, is perceived, wherein the three-dimensional image for testing comprises (1) a lower side image area which is perceived as a stereoscopic image part located in a first depth space in front of the display surface, and (2) an upper side image area which is perceived as a stereoscopic image part located in a second depth space behind the display surface, and wherein the stereoscopic image of the bottom surface comprises a first stereoscopic image part which is perceived as a stereoscopic image part located in the first depth space in front of the display surface and a second stereoscopic image part which is perceived as a stereoscopic image part located in the second depth space behind the display surface, the first stereoscopic image part being disposed on the lower side image area, the second stereoscopic image part being disposed on the upper side image area.

10. The three-dimensional image display apparatus of claim 9, wherein the three-dimensional image for testing further includes such a second image that when the three-dimensional image for testing is viewed from the predetermined viewing area, stereoscopic images of a plurality of vertical rods disposed at different depth positions are perceived, and wherein the stereoscopic images of the plurality of vertical rods are perceived at different depth positions on the upper side image area.

11. The three-dimensional image display apparatus of claim 10, wherein the plurality of vertical rods are disposed on the bottom surface having the picture pattern of the checker pattern.

12. A three-dimensional image display apparatus comprising:

a receiver configured to receive video content data;

a signal processor configured to display three-dimensional images, based on the received video content data;

a nonvolatile memory having stored thereon three-dimensional still image data for testing, the three-dimensional still image data comprising a left-eye image and a right-eye image; and a controller configured to display, when an event of requesting a check of a viewing position occurs, a three-dimensional image for testing, based on the three-dimensional still image data for testing, wherein the three-dimensional image for testing includes such a first image that when the three-dimensional image for testing is viewed from a predetermined viewing area, a stereoscopic image of a bottom surface having a picture pattern of a checker pattern, which extends between a depth position in front of a display surface of the display and a depth position behind the display surface, is perceived, wherein the three-dimensional image for testing comprises (1) a lower side image area which is perceived as a stereoscopic image part located in a first depth space in front of the display surface, and (2) an upper side image area which is perceived as a stereoscopic image part located in a second depth space behind the display surface, and wherein the stereoscopic image of the bottom surface comprises a first stereoscopic image part which is perceived as a stereoscopic image part located in the first depth space in front of the display surface and a second stereoscopic image part which is perceived as a stereoscopic image part located in the second depth space behind the display surface, the first stereoscopic image part being disposed on the lower side image area, the second stereoscopic image part being disposed on the upper side image area.

13. The three-dimensional image display apparatus of claim 12, wherein the three-dimensional image for testing further includes such a second image that when the three-dimensional image for testing is viewed from the predetermined viewing area, stereoscopic images of a plurality of vertical rods disposed at different depth positions are perceived, and wherein the stereoscopic images of the plurality of vertical rods are perceived at different depth positions on the upper side image area.

14. The three-dimensional image display apparatus of claim 1, wherein the three-dimensional image display apparatus is configured to display a three-dimensional image by using a glasses method or a glasses-less method.

15. The three-dimensional image display apparatus of claim 6, wherein the three-dimensional image display apparatus is configured to display a three-dimensional image by using a glasses method or a glasses-less method.

16. The three-dimensional image display apparatus of claim 9, wherein the three-dimensional image display apparatus is configured to display a three-dimensional image by using a glasses method or a glasses-less method.

17. The three-dimensional image display apparatus of claim 12, wherein the three-dimensional image display apparatus is configured to display a three-dimensional image by using a glasses method or a glasses-less method.

* * * * *